(12) United States Patent
Ahn et al.

(10) Patent No.: US 9,285,921 B2
(45) Date of Patent: Mar. 15, 2016

(54) TOUCH PANEL DISPLAY DEVICE AND DRIVING METHOD THEREOF

(75) Inventors: In Ho Ahn, Gyeonggi-do (KR); Min Ho Sohn, Gyeonggi-do (KR); Deuk Su Lee, Gyeonggi-do (KR); Kyo Hyuck Choo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 528 days.

(21) Appl. No.: 12/485,717

(22) Filed: Jun. 16, 2009

(65) Prior Publication Data
US 2010/0164883 A1 Jul. 1, 2010

(30) Foreign Application Priority Data
Oct. 21, 2008 (KR) .................. 10-2008-0103061

(51) Int. Cl.
| | |
|---|---|
| G06F 3/041 | (2006.01) |
| G06F 3/042 | (2006.01) |
| G02F 1/1333 | (2006.01) |
| G09G 3/34 | (2006.01) |
| G02F 1/1335 | (2006.01) |
| G02F 1/133 | (2006.01) |

(52) U.S. Cl.
CPC ............ *G06F 3/042* (2013.01); *G02F 1/13338* (2013.01); *G06F 3/0412* (2013.01); *G09G 3/3406* (2013.01); *G02F 1/133514* (2013.01); *G02F 2001/13312* (2013.01); *G09G 2320/064* (2013.01); *G09G 2360/144* (2013.01)

(58) Field of Classification Search
CPC ............... G09G 2360/144; G09G 2360/141; G09G 2360/142; G09G 2320/064; G09G 3/3406; G09G 2300/0456; G06F 3/0421; G06F 3/042; G06F 3/0412; G06F 3/0416; G02F 2001/13312; G02F 1/13338; G02F 1/1354; G02F 1/133514

USPC ................................. 345/175, 173, 690, 32; 178/18.01–20.04; 382/103; 341/127–173
See application file for complete search history.

(56) References Cited

U.S. PATENT DOCUMENTS

| | | | |
|---|---|---|---|
| 2004/0008172 A1* | 1/2004 | Nakamura ............ | G06F 3/0412 345/89 |
| 2005/0151065 A1* | 7/2005 | Min ......................... | 250/214 R |
| 2006/0138983 A1* | 6/2006 | Lee ........................ | G06F 3/0414 349/56 |
| 2008/0074401 A1* | 3/2008 | Chung et al. .................. | 345/175 |
| 2008/0122803 A1* | 5/2008 | Izadi ...................... | G06F 3/0421 345/175 |

(Continued)

FOREIGN PATENT DOCUMENTS

| | | |
|---|---|---|
| KR | 1020050117464 A | 12/2005 |
| KR | 1020080028270 A | 3/2008 |

OTHER PUBLICATIONS

Notice of Allowance dated Sep. 3, 2013 from the Korean Patent Office in counterpart Korean application No. 10-2008-0103061.

*Primary Examiner* — Grant Sitta
*Assistant Examiner* — Amen Bogale
(74) *Attorney, Agent, or Firm* — Morgan, Lewis & Bockius LLP (57) ABSTRACT

A touch panel display device and a driving method thereof are disclosed. The touch panel display device and the driving method thereof sense illumination of external light using a photo-sensor formed on a touch panel, and control a PWM duty of a light source suited to each mode when the sensed illumination of external light corresponds to illumination in a gray zone to be a difference between the illumination of light created by the light source and that of external light, thereby improving touch recognition capability in a gray zone.

10 Claims, 5 Drawing Sheets

(56) References Cited

U.S. PATENT DOCUMENTS

| | | | |
|---|---|---|---|
| 2008/0246905 A1* | 10/2008 | Chen et al. | 349/106 |
| 2008/0248837 A1* | 10/2008 | Kunkel | G09G 3/3406 455/566 |
| 2009/0009455 A1* | 1/2009 | Kimura | 345/89 |
| 2009/0073327 A1* | 3/2009 | Watanabe et al. | 348/837 |
| 2009/0146981 A1* | 6/2009 | Chen et al. | G09G 3/3406 345/207 |
| 2009/0152445 A1* | 6/2009 | Gardner, Jr. | 250/214 AL |
| 2010/0026853 A1* | 2/2010 | Mokhnatyuk | 348/240.2 |
| 2010/0059296 A9* | 3/2010 | Abileah et al. | 178/18.09 |
| 2010/0090996 A1* | 4/2010 | Chou et al. | 345/207 |

\* cited by examiner

TOUCH PANEL DISPLAY DEVICE AND DRIVING METHOD THEREOF

CROSS-REFERENCE TO RELATED APPLICATION

This application claims priority under 35 U.S.C. 119 to Korean Patent Application No. 10-2008-0103061, filed on Oct. 21, 2008, which is hereby incorporated by reference in its entirety.

BACKGROUND

1. Field of the Disclosure

The disclosure relates to a display device, more particularly which can improve touch recognition capability in a gray zone where illumination of light created by a light source is similar to that of external light.

2. Description of the Related Art

In general, personal computers (PCs), portable transmitters, or other personal information processors process texts or graphics using various types of input devices such as key board, mouse, or digitizer. However, as an application field of the PCs spreads, it is often difficult to apply these input devices to the PCs as an interface input device. Unlike these input device, a touch screen has been known as an input device which is simpler than the keyboard and the mouse, has less erroneous operation, allows a user to easily operate, or allows a user to carry it and to input characters with a hand. The touch screen is the most advanced input device replacing the keyboard and the mouse. The touch screen is implemented by mounting a touch panel to a monitor. A user touches the touch screen on the monitor with a hand to perform a desired task, so that an intuitive task can be achieved under a Windows operating system.

Such a touch screen may be widely used in computer based training and simulation, office automation, and education and game application fields. Recently, the touch screen is mounted and used to a portable communication device such as a mobile communication phone. The touch screen has a touch panel, a controller, a device driver, and application software as a fundamental construction. In addition to this, detecting method, arrangement, and performance in accordance with the fundamental construction have been widely known.

A display device with the touch panel operates in a reflection mode or a shade mode. In a case where the display device operating in the reflection mode, in a dark environment free from external light, light created by a light source included in the display device is reflected from a finger touching the touch panel and then enters a photo-sensor. The photo-sensor senses the entered light to judge touch coordinates. In a case where the display device operating in the shade mode, in a bright environment of external light, a shade occurs in a finger part by the external light. As the shade is introduced in the photo-sensor, the photo-sensor senses light corresponding to the shade to judge touch coordinates.

In conclusion, the display device with the touch panel may sense a touched part brighter than a peripheral environment in dark illumination to recognize touch coordinates. Further, the display device with the touch panel may sense a touched part darker than a peripheral environment in bright illumination to recognize the touch coordinates.

Meanwhile, in a case of a gray zone where illumination of light created by a light source of a backlight unit included in a touch panel display device is similar to that of external light, illumination of touch coordinates touching the touch panel does not appear darker or brighter than a peripheral zone. Due to this, touch recognition capability is reduced in the gray zone where illumination of light created by a light source of a backlight unit included in a touch panel display device is similar to that of external light.

BRIEF SUMMARY

Accordingly, the present embodiments are directed to a touch panel display device that substantially obviates one or more of problems due to the limitations and disadvantages of the related art.

An object of the embodiment of the present disclosure is to provide a touch panel display device which can improve touch recognition capability in a gray zone where illumination of light created form a light source of a backlight unit is similar to that of external light and a method of driving the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a touch panel display device comprising: a touch panel on which a photo-sensor sensing external light is formed; a backlight unit having a light source creating light to be irradiated to the touch panel; a readout circuit unit sensing illumination of the external light entered from the photo-sensor to remove noises to be introduced in the entered illumination of the external light, and converting and outputting the entered illumination of the external light into a digital signal; an illumination sensing area selector receiving an output signal of the readout circuit unit and selecting at least one of a plurality of divided areas of the touch panel; an area average calculator calculating an average of the sensed illumination of the external light from the photo-sensor according to the area selected by the illumination sensing area selector; a weight average calculator applying a weight to the calculated average from the area average calculator to calculate an average during several frames; a memory unit outputting a PWM duty corresponding to the calculated average to which the weight is applied from the weight average calculator; a PWM signal generator generating a PWM signal with the PWM duty output from the memory unit; and a lamp driving voltage generator generating a lamp driving voltage corresponding to the PWM signal generated by the PWM signal generator to control the light source of the backlight unit.

According to another aspect of the present embodiment, a method of driving a touch panel display device including a touch panel on which a photo-sensor sensing external is formed, and a backlight unit having a light source creating light to be irradiated to the touch panel, comprising: sensing illumination of external light entered from the photo-sensor to remove noises to be introduced in the entered illumination of the external light, and converting and outputting the entered illumination of the external light into a digital signal; dividing the touch panel into a plurality of divided areas and selecting at least one of the plurality of divided areas; calculating an average of the sensed illumination of external light to be converted into a digital signal according to the selected area; applying a weight to the calculated average to calculate an average during several frames; outputting a PWM duty corresponding to the calculated average to which the weight is applied; generating a PWM signal with the PWM duty; and generating a lamp driving voltage corresponding to the PWM signal to control the light source of the backlight unit.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 1:
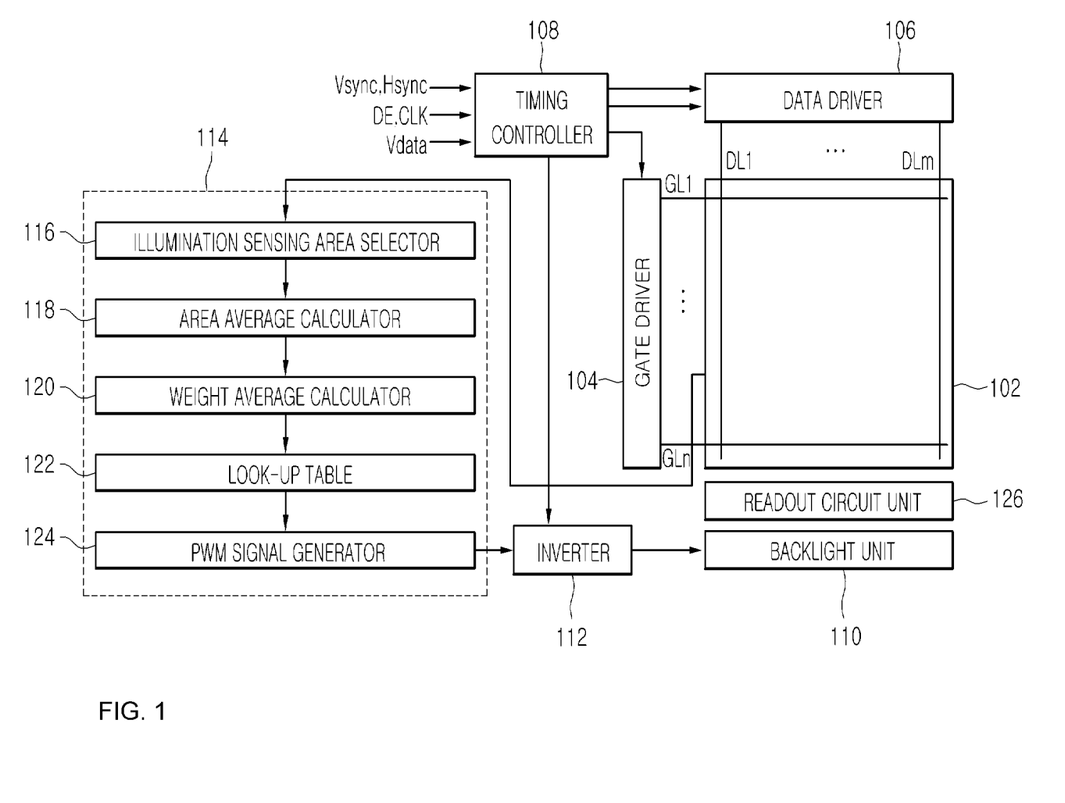
FIG. 1 is a block diagram of a touch panel display device according to an embodiment of the present disclosure.

FIG. 1 is a block diagram of a touch panel display device according to an embodiment of the present disclosure. Referring to FIG. 1, a touch panel display device according to an embodiment of the present disclosure includes a touch panel 102 displaying an image, a gate driver 104 driving a plurality of gate lines GL1~GLn on the touch panel, a data driver 106 driving a plurality of data lines DL1~DLm on the touch panel 102, a timing controller 108 controlling drive timing of the gate driver 104 and the data driver 106, a backlight unit 110 irradiating light on the touch panel 102, and an inverter 112 generating a drive voltage of a light source included in the backlight unit 110.

The touch panel display device according to an embodiment of the present disclosure further includes a PWM modulation unit 114 controlling on/off intervals of a light source included in the backlight unit 100 using illumination of external light sensed by a photo thin film transistor of the touch panel 102.

The touch panel 102 includes pixels formed at areas defined by the plurality of gate lines GL1~GLn and the plurality of data lines DL1~DLm. Each of the pixels includes a thin film transistor (TFT) formed in an area where a corresponding gate line GL and a corresponding data line DL cross, and a liquid crystal cell coupled between the TFT and a common electrode. The TFT switches a pixel data voltage to be supplied to a corresponding liquid crystal cell from a corresponding data line DL in response to a gate scan signal on a corresponding gate line GL.

The touch panel 102 operates in a reflection mode in dark external environment, and in a shade mode in bright environment.

Figure 2:
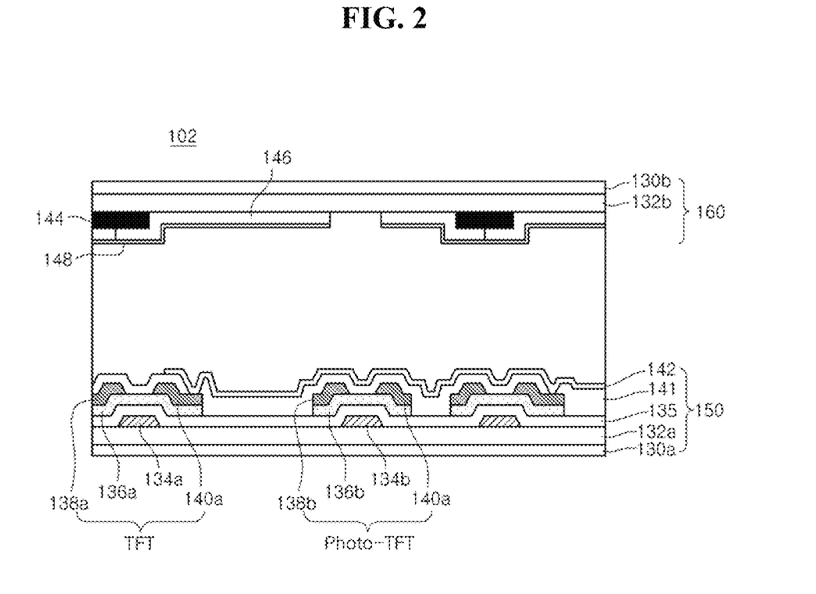
FIG. 2 is a cross-sectional view illustrating a part of a touch panel shown in FIG. 1.

As shown in FIG. 2, the touch panel 102 is composed of a TFT array substrate 150 on which the TFT and a photo-TFT are formed, a color filter substrate 160 facing the TFT array substrate 150 and on which a color filter 146, a black matrix 144, and a common electrode 148 are formed, and a liquid crystal layer (not shown) formed between the TFT array substrate 150 and the color filter substrate 160.

In detail, the TFT array substrate 150 includes first and second gate electrodes 134a and 134b extending from a gate line on a first substrate 132a, a gate insulation layer 135 on the first substrate 132a formed on which the first and second gate electrodes 134a and 134b are formed, and first and second semiconductor layers 136a and 136b formed on the first substrate 132a on which the gate insulation layer 135 is formed corresponding to the first and second gate electrodes 134a and 134b, respectively.

Further, the TFT array substrate 150 further includes first source and drain electrodes 138a and 140a formed on the first semiconductor layer 136a to be spaced apart from each other, second source and drain electrodes 138b and 140b formed on the second semiconductor layer 136b to be spaced apart from each other simultaneously with the formation of the first source and drain electrodes 138a and 140a, a passivation layer 141 formed on the first substrate 132a on which the first source and drain electrodes 138a and 140a and the second source and drain electrodes 138b and 140b are formed, and a pixel electrode 142 electrically connected to the first drain electrode 140a on the first substrate 132a via a contact hole. The TFT array substrate 150 having a construction mentioned above also includes a first polarizer 130a attached to a lower portion of the first substrate 132a.

The first gate electrode 134a, the first semiconductor layer 136a, and the first source and drain electrodes 138a and 140a configure the TFT arranged in a pixel region of the touch panel 102.

The second gate electrode 134b, the second semiconductor layer 136b, and the second source and drain electrodes 138b and 140b configure the photo-TFT of the touch panel 102. The photo-TFT is not coupled with the pixel electrode 142. The TFT array substrate 150 may include at least one photo-TFT.

Meanwhile, the color filter substrate 160 includes a black matrix 144 formed in a corresponding part of the TFT of the TFT array substrate 150 on the second substrate 132b, a color filter 146 formed on the second substrate 132b on which the black matrix 144 is formed, and a common electrode formed on the second substrate 132b on which the color filter 146 is formed. The color filter substrate 160 also has a second polarizer attached to an upper portion of the second substrate 132b.

The black matrix 144, the color filter 146, and the common electrode 148 are not formed on the color filter substrate 160 corresponding to a formation part of the photo-TFT of the TFT array substrate 150. Due to this, external light may freely enter the photo-TFT. The photo-TFT recognizes parts touched by a user and senses illumination of the external light entered on the touch panel 102.

The gate driver 140 supplies a plurality of gate scan signals to the plurality of gate lines GL1~GLn in response to gate control signals GCS from the timing controller 108, respectively. The plurality of gate scan signals control the plurality of gate line GL1~GLn to be sequentially enabled in units of one horizontal sync signal interval.

The data driver 106 generates a plurality of pixel data voltages each time one of the plurality of gate lines DL1~DLm is enabled in response to data control signals DCS from the timing controller 108, and provides them to the plurality of data lines DL1~DLm, respectively. In order to do this, the data driver 106 receives pixel data from the timing controller 110 for each line, and converts pixel data of one line into analog pixel data voltages using a gamma voltage set.

The timing controller 108 generates the gate control signals GCS, the data control signals DCS, and a polar inversion signal POL using a data clock CLK, a horizontal sync signal Hsync, a vertical sync signal Vsync, and a data enable signal DE from an external system (not shown). In this case, there is a graphic module of a computer system or an image demodulation module of a television receiving system as an example of the external system. The gate control signals GCS are supplied to the gate driver 104, and the data control signals DCS and the polar inversion signal POL are supplied to the data driver 106.

The backlight unit 110 includes a light source (e.g., lamp) creating light, a diffusion plate disposed between the touch panel 102 and the light source, at least one diffusion sheet, and optical sheets such as prism sheet. The inverter 112 controls on/off timing of the light source included in the backlight unit 110, and generates a driving voltage for driving the light source.

Furthermore, the touch panel display device according to the present disclosure further includes a readout circuit unit 126 converting the sensed illumination of external light from the photo-TFT of the touch panel 102 into a voltage value, and converting the voltage value into a digital signal.

Figure 3:
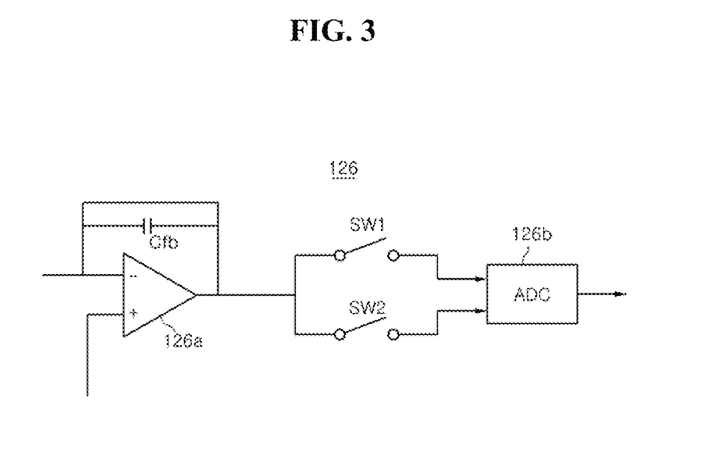
FIG. 3 is a view of a readout circuit unit shown in FIG. 1.

Referring to FIG. 3, the readout circuit unit 126 may be contributed by an integrator 126a electrically connected to the photo-TFT of the touch panel 102 for converting the sensed illumination of external light from the photo-TFT into a voltage value and for removing noises that may be introduced in the sensed illumination of external light, first and second switch elements sw1 and sw2 connected to an output terminal of the integrator 126a for sampling outputs of the first and second switch elements sw1 and sw2, and an analog-digital converter (ADC) 126b converting a selectively sampled voltage through the first and second switch elements sw1 and sw2 into a digital signal. The digital signal from the ADC 126b is provided to the PWM modulation unit 114.

The PWM modulation unit 114 includes an illumination sensing area selector 116 receiving the sensed illumination of external light from the photo-TFT of the touch panel 102 and selecting at least one of a plurality of divided areas of the touch panel 102; an area average calculator 118 calculating an average of sensed illumination of the area selected by the illumination sensing area selector 116; a weight average calculator 120 applying a weight to the average of sensed illumination of the area calculated by the area average calculator 118 to calculate a weighted average during several frames; a look-up table 122 to which a plurality of PWM duties are mapped and outputting a PWM duty corresponding to the weighted average calculated by the weight average calculator 120; and a PWM signal generator 124 generating a PWM signal corresponding to the PWM duty output from the look-up table 122.

The illumination sensing area selector 116 receives a digital signal output from the ADC 126b and selects at least one of a plurality of divided areas of the touch panel 102. In this case, the illumination sensing area selector 116 may select a whole area of the touch panel 102. The digital signal with the sensed illumination of external light corresponding to the area of the touch panel 102 selected by the illumination sensing area selector 116 is input to the area average calculator 118.

The area average calculator 118 calculates an average of the sensed illumination of external light corresponding to the area of the touch panel 102 selected by the illumination sensing area selector 116. In this case, the area average calculator 118 calculates the average of the sensed illumination of external light corresponding to the area of the touch panel 102 selected by the illumination sensing area selector 116 or through sub block histogram calculation. The sub block histogram calculation divides the sensed illumination of external light corresponding to the area of the touch panel 102 selected by the illumination sensing area selector 116 into specific areas (e.g., k1~k2) and calculates an average of histograms in the specific areas k1~k2.

The area average calculated by the area average calculator 118 is input to the weight average calculator 120.

The weight average calculator 120 applies a weight to the area average input from the area average calculator 118 through a following equation 1 to calculate an average during several frames. The calculation of the average during several frames by applying the weight to the area average input from the area average calculator 118 is not to be sensitively changed due to small variation amount of the illumination of external light.

$$ASL = \left[\sum_{i=1}^{M}(ai \cdot Fi)\right] / M \qquad \text{[Equation 1]}$$

where, ai represents a weight by frames, M represents the number of frames, F represents an area average, and ASL represents a weighted average. For example, the weight ai by frames may be variously set in such a way that the latest frame has the greatest weighting value.

Through the equation 1, the weight average calculator 120 applies a weight to the area average input from the area average calculator 118 to calculate an average during several frames. The calculated weight average is input to the look-up table 122.

PWM duties are mapped in the look-up table 122. In this case, the PWM duties have different duty cycles by modes (reflection mode and shade mode) in accordance with the illumination of external light. A plurality of look-up tables 122 can be used. In detail, when the touch panel 102 operates in the reflection mode or the shade mode, a plurality of look-up tables 122 in which a PWM duty suited to the reflection mode or the shade mode may be constructed. According to a mode of the touch panel 102, the look-up table 122 selects a PWM duty corresponding to the weight average input from the weight average calculator 120.

Figure 4:
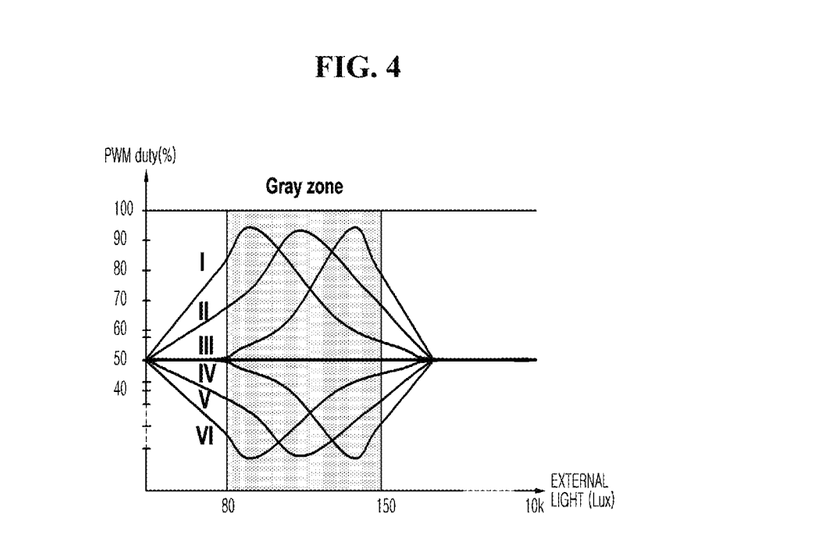
FIG. 4 is a view illustrating pulse width modulation (PWM) duties by modes mapped in a look-up table.

As shown in FIG. 4, when the touch panel 102 operates in a reflection mode (I~III), a PWM duty with a specially high duty in a gray zone where illumination of light created by a light source included in the backlight unit 110 is similar to that of external light is mapped in the look-up table 122. Further, when the touch panel 102 operates in the shade mode (IV~VI), a PWM duty with a specially low duty in the gray zone is mapped in the look-up table 122.

When the touch panel 102 operates in the reflection mode (I~III), a reason why the PWM duty has a specially high duty in the gray zone is to be a difference between the illumination of light created by the light source of the backlight unit 110 and that of external light by increasing the illumination of light created by the light source to become greater than that of external light. Accordingly, when the touch panel 102 operates in the reflection mode, recognition capability of the touch panel 102 may be improved by increasing the illumination of light created by the light source in the gray zone to differ from that of external light.

Meanwhile, when the touch panel 102 operates in the shade mode (IV~VI), a reason why the PWM duty has a specially low duty in the gray zone is to be a difference between the illumination of light created by the light source of the backlight unit 110 and that of external light by reducing the illumination of light created by the light source to become less than that of external light. Accordingly, when the touch panel 102 operates in the shade mode, the recognition capability of the touch panel 102 may be improved by reducing the illumination of light created by the light source in the gray zone to differ from that of external light.

Accordingly, a PWM duty corresponding to a weight average input from the weight average calculator 120 when the touch panel 102 operates in the reflection mode (I~III) is greater than that corresponding to a weight average input from the weight average calculator 120 when the touch panel 102 operates in the shade mode (IV~VI).

The look-up table 122 outputs the PWM duty corresponding to the weight average input from the weight average calculator 120 to the PWM signal generator 124 according to which the touch panel 102 operates in the reflection mode or the shade mode.

The PWM signal generator 124 generates a PWM signal with on/off intervals corresponding to the PWM duty output from the look-up table 122. The inverter 112 generates a driving voltage driving the light source included in the backlight unit 110 corresponding to the PWM signal from the PWM signal generator 124.

Figure 5:
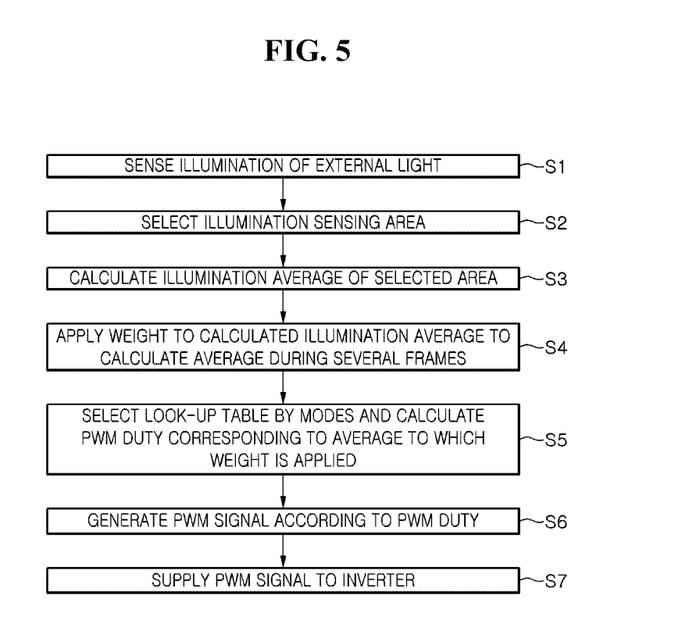
FIG. 5 is a flow chart illustrating an operation sequence of a PWM modulation unit shown in FIG. 1.

FIG. 5 is a flow chart illustrating an operation sequence of a PWM modulation unit 114 shown in FIG. 1. Referring to FIG. 1 and FIG. 5, the photo-TFT included in the touch panel 102 senses illumination of external light (S1). Next, the touch panel 102 is divided into a plurality of areas, and at least one of the plurality of areas is selected (S2). An average of illumination of light corresponding to the selected area is calculated (S3). A weight is applied to the calculated average to calculate an average during several frames (S4). A look-up table is selected suited to a mode (reflection mode or shade mode) of the touch panel 102, and a PWM duty is output from the look-up table corresponding to the average to which the weight is applied (S5). A PWM signal according to the PWM duty is generated (S6) and is supplied to the inverter 112 (S7).

Figure 6:
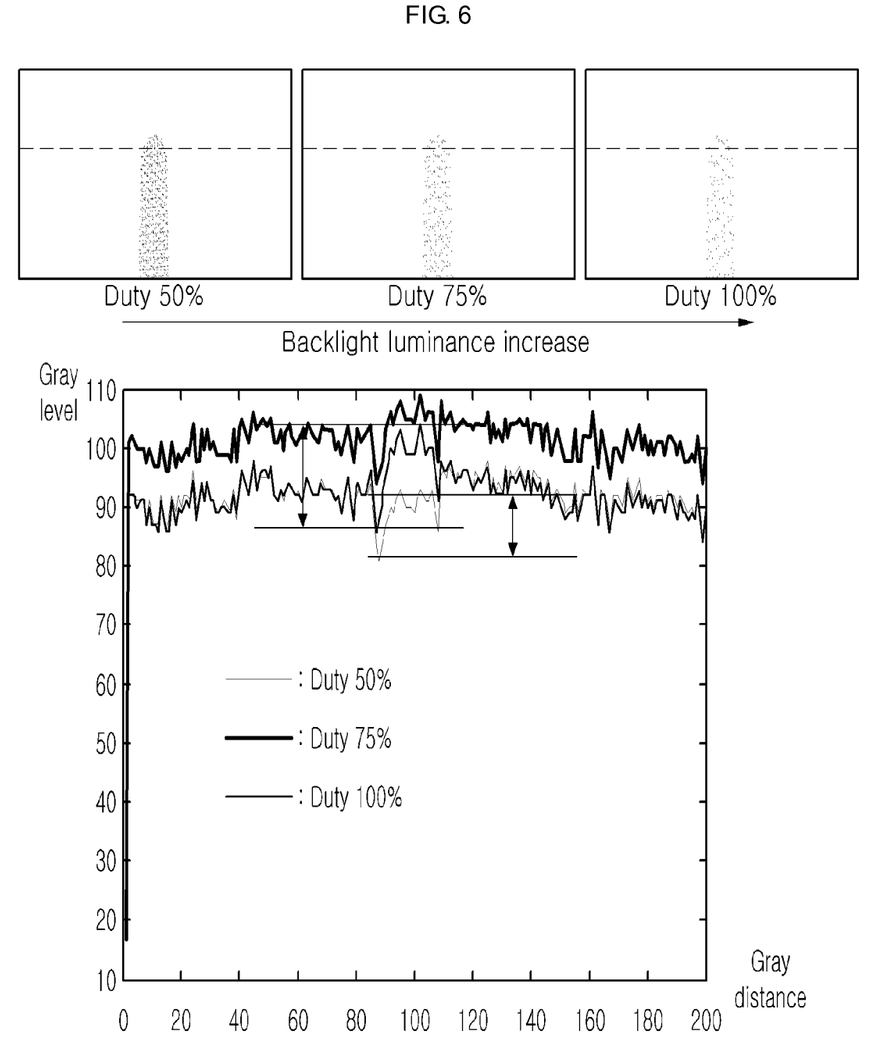
FIG. 6 is a waveform diagram illustrating experimental data when the touch panel display device shown in FIG. 1 is applied.

FIG. 6 is a waveform diagram illustrating experimental data when the touch panel display device shown in FIG. 1 is applied. Referring to FIG. 1 and FIG. 6, the waveform diagram illustrates experimental data judging touch recognition capability of the touch panel according to an image gradation difference between a touched part of the touch panel and a non-touched part thereof after 50%, 75%, and 100% duties of a light source of the touch panel display device according the present disclosure are applied to a gray zone, respectively. In the touch panel display device according to the present disclosure, under the control of the PWM modulation unit 114, 50%, 75%, and 100% duties of a light source are applied, in conjunction with a luminance of light generated from the light source, a difference occurs between an image of a touched part of the touch panel 102 and an image of a peripheral area (non-touched part), thereby improving touch recognition capability (significant variation in the waveform diagram).

As illustrated in the waveform diagram of FIG. 6, the touch panel display device according to the present disclosure senses illumination of external light and controls illumination of light generated by a light source of the backlight unit 110 using the sensed illumination of the external light. In particular, it may make a difference between an image of a touched part of the touch panel and that of a periphery to improve touch recognition capability of the touch panel 102.

As described above, the present disclosure may include a photo-sensor sensing external light, and control a PWM duty of a light source in a backlight unit according to a reflection mode or a shade mode based on illumination of external light sensed by the photo-sensor to improve touch recognition capability in a gray zone.

It will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. A touch panel display device comprising:
    a touch panel comprising a TFT array substrate and a color filter substrate;
    a photo-sensor sensing external light formed on the TFT array substrate;
    a backlight unit having a light source creating light to be irradiated to the touch panel;
    a readout circuit unit sensing illumination of the external light entered from the photo-sensor to remove noises to be introduced in the entered illumination of the external light, and converting and outputting the entered illumination of the external light into a digital signal;
    an illumination sensing area selector receiving an output signal of the readout circuit unit and selecting at least one of a plurality of divided areas of the touch panel;
    an area average calculator calculating an average of the sensed illumination of the external light from the photo-sensor according to the area selected by the illumination sensing area selector;
    a weight average calculator applying a weight to the calculated average from the area average calculator to calculate an average during several frames;
    a memory unit outputting a PWM duty corresponding to the calculated average to which the weight is applied from the weight average calculator;
    a PWM signal generator generating a PWM signal with the PWM duty output from the memory unit; and
    a lamp driving voltage generator generating a lamp driving voltage corresponding to the PWM signal generated by the PWM signal generator to control the light source of the backlight unit,
    wherein the readout circuit unit comprises an integrator electrically connected to the photo-sensor for converting the sensed illumination of external light from the photo-sensor into a voltage value, first and second switch elements connected to an output terminal of the integer for sampling outputs of the first and second switch elements, and an analog-digital converter converting a selectively sampled voltage through the first and second switch elements into a digital signal, wherein the integrator removes noises that is introduced in the sensed illumination of external light, wherein illumination of the light source is controlled by the sensed illumination of the external light in a gray zone where the illumination of the light source is similar to the illumination of the external light, wherein the touch panel operates in a reflection mode in dark external environment, and in a shade mode in bright environment, wherein the illumination of the light source in the reflection mode is higher than the illumination of the light source in the shade mode in order to improve touch recognition capability of the touch panel, wherein the weight is set up with the latest frame to have the greatest weighting value, wherein the color filter substrate includes a color filter and substrate, wherein the color filter is formed on the substrate except an area which corresponds to the photo-sensor, wherein the color filter substrate further includes a black matrix and a common electrode, and wherein the black matrix, the color filter, and the common electrode are absent on the substrate at the area which corresponds to the photo-sensor, thereby allowing the external light to freely enter the photo-sensor.

2. The touch panel display device as claimed as claim 1, wherein the memory unit includes a look-up table.

3. The touch panel display device as claimed as claim 1, wherein the illumination sensing area selector selects a partial area or a whole area of the touch panel.

4. The touch panel display device as claimed as claim 1, wherein the memory unit stores PWM duties by the reflection mode or the shade mode of the touch panel corresponding to the calculated average from the weight average calculator.

5. The touch panel display device as claimed as claim 1, wherein the area average calculator calculates an illumination sensing average of a selected area or an illumination sensing average using a histogram corresponding to sub blocks divided from the selected area.

6. A method of driving a touch panel display device including a touch panel comprising a TFT array substrate and a color filter substrate, a photo-sensor sensing external light formed on the TFT array substrate, and a backlight unit having a light source creating light to be irradiated to the touch panel, comprising:

sensing illumination of external light entered from the photo-sensor to remove noises to be introduced in the entered illumination of the external light;

converting the sensed illumination of external light into a voltage value, and sampling the voltage level using first and second switch elements; and converting a selectively sampled voltage through the first and second switch elements into a digital signal;

dividing the touch panel into a plurality of divided areas and selecting at least one of the plurality of divided areas;

calculating an average of the sensed illumination of external light to be converted into a digital signal according to the selected area;

applying a weight to the calculated average to calculate an average during several frames;

outputting a PWM duty corresponding to the calculated average to which the weight is applied;

generating a PWM signal with the PWM duty; and generating a lamp driving voltage corresponding to the PWM signal to control the light source of the backlight unit, wherein illumination of the light source is controlled by the sensed illumination of the external light in a gray zone where the illumination of the light source is similar to the illumination of the external light, wherein the touch panel operates in a reflection mode in dark external environment, and in a shade mode in bright environment, wherein the illumination of the light source in the reflection mode is higher than the illumination of the light source in the shade mode in order to improve touch recognition capability of the touch panel, wherein the weight is set up with the latest frame to have the greatest weighting value, wherein the color filter substrate includes a color filter and substrate, wherein the color filter is formed on the substrate except an area which corresponds to the photo-sensor, wherein the color filter substrate further includes a black matrix and a common electrode, and wherein the black matrix, the color filter, and the common electrode are absent on the substrate at the area which corresponds to the photo-sensor, thereby allowing the external light to freely enter the photo-sensor.

7. The method as claimed as claim 6, wherein the selected area selector is a partial area or a whole area of the touch panel.

8. The method as claimed as claim 6, wherein the calculating-an-average-of-the-sensed-illumination-of-external-light calculates an illumination sensing average of a selected area or an illumination sensing average using a histogram corresponding to sub blocks divided from the selected area.

9. The touch panel display device as claimed as claim 4, wherein PWM duties of the reflection mode has a high duty in the gray zone.

10. The touch panel display device as claimed as claim 4, wherein PWM duties of the shade mode has a low duty in the gray zone.

* * * * *